(12) United States Patent
Lee et al.

(10) Patent No.: US 8,544,102 B2
(45) Date of Patent: Sep. 24, 2013

(54) INTEROPERABLE DIGITAL RIGHTS MANAGEMENT DEVICE AND METHOD THEREOF

(75) Inventors: Joo-Young Lee, Daejon (KR); Hyun-Gon Choo, Daejon (KR); Je-Ho Nam, Seoul (KR); Bum-Suk Choi, Daejon (KR); Jin-Woo Hong, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 676 days.

(21) Appl. No.: 12/596,195

(22) PCT Filed: Apr. 17, 2008

(86) PCT No.: PCT/KR2008/002163
§ 371 (c)(1),
(2), (4) Date: May 21, 2010

(87) PCT Pub. No.: WO2008/130134
PCT Pub. Date: Oct. 30, 2008

(65) Prior Publication Data
US 2010/0242116 A1    Sep. 23, 2010

(30) Foreign Application Priority Data

Apr. 18, 2007 (KR) .................. 10-2007-0038034
Apr. 15, 2008 (KR) .................. 10-2008-0034563

(51) Int. Cl.
*G06F 21/00* (2013.01)

(52) U.S. Cl.
USPC .......................................................... 726/26

(58) Field of Classification Search
USPC .......................................................... 726/26
See application file for complete search history.

(56) References Cited

U.S. PATENT DOCUMENTS

| | | | |
|---|---|---|---|
| 7,779,479 B2* | 8/2010 | Lee et al. | 726/27 |
| 8,214,303 B2* | 7/2012 | Choi et al. | 726/26 |
| 2003/0078891 A1 | 4/2003 | Capitant | |
| 2006/0010498 A1* | 1/2006 | Oh et al. | 726/26 |
| 2006/0026691 A1 | 2/2006 | Kim et al. | |
| 2007/0204078 A1 | 8/2007 | Boccon-Gibod et al. | |
| 2008/0162170 A1* | 7/2008 | Kumar et al. | 705/1 |
| 2008/0163377 A1* | 7/2008 | Lee et al. | 726/26 |
| 2008/0163378 A1* | 7/2008 | Lee | 726/27 |
| 2008/0172678 A1* | 7/2008 | Lee et al. | 719/315 |
| 2008/0250504 A1* | 10/2008 | Kwon et al. | 726/26 |
| 2009/0025085 A1* | 1/2009 | Kim et al. | 726/26 |
| 2009/0044278 A1* | 2/2009 | Lim | 726/26 |
| 2009/0158437 A1* | 6/2009 | Kim et al. | 726/26 |
| 2009/0158439 A1* | 6/2009 | Lee et al. | 726/26 |
| 2010/0031366 A1* | 2/2010 | Knight et al. | 726/26 |
| 2010/0235925 A1* | 9/2010 | Lee | 726/30 |
| 2011/0023083 A1* | 1/2011 | Eom et al. | 726/1 |

FOREIGN PATENT DOCUMENTS

| | | |
|---|---|---|
| JP | 2003-067409 A | 3/2003 |
| KR | 10-2005-0062342 A | 6/2005 |
| WO | WO-02-101493 A2 | 12/2002 |
| WO | WO-2006/043784 A1 | 4/2006 |

* cited by examiner

*Primary Examiner* — Krisna Lim
(74) *Attorney, Agent, or Firm* — Rabin & Berdo, P.C.

(57) ABSTRACT

Provided are an interoperable DRM device and method thereof. The interoperable DRM device includes: an interface for communicating with a terminal that performs predetermined operations for reproducing contents; and a DRM processor for managing digital rights of the contents. The DRM processor exchanges messages with the terminal for interoperably managing the digital rights.

40 Claims, 5 Drawing Sheets

INTEROPERABLE DIGITAL RIGHTS MANAGEMENT DEVICE AND METHOD THEREOF

TECHNICAL FIELD

The present invention relates to a digital rights management device and method thereof; and, more particularly, to an interoperable digital rights management device and method thereof.

This work was supported by the IT R&D program of MIC/IITA [2007-S-003-01, "Development of Protection Technology for Terrestrial DTV Program"].

BACKGROUND ART

Digital Rights Management (DRM) is a technology for protecting rights of digital contents. As the Internet has been popularized and digital contents have been actively distributed, illegal copy and unauthorized use of digital contents have been at issue. In order to protect the digital contents from the illegal copy and unauthorized use, a digital rights management (DRM) technology was introduced. The DRM technology was used to prevent illegal copying of contents such as music files, video files, and electric books. Lately, the DRM technology has been used in various fields for protecting digital contents, such as, mobile, document security, and digital broadcasting. The applicable field of the DRM technology has been expanding for providing various services such as contents production, contents management, contents distribution, and payment management.

However, the conventional DRM technology was incapable of accommodating and managing digital contents with DRMs of different services and different manufacturers applied thereto together because it cannot unify heterogeneous DRMs provided from various manufacturers.

In order to accommodate and managing heterogeneous DRMs in one platform in the conventional DRM technology, DRM information applied to contents should be analyzed, and tool agent modules used for each of DRMs should be loaded for performing copyright protection according to content protection information.

The above described DRM processes were performed in a contents consuming terminal, and a manufacturer of a terminal had burden to embody a DRM processing module for each terminal in order to perform the DRM processing processes in a terminal.

DISCLOSURE

Technical Problem

An embodiment of the present invention is directed to providing an interoperable Digital Rights Management (DRM) device and a method thereof for accommodating and managing digital contents that Digital Rights Management of different services and different manufacturers are applied thereto together.

Another embodiment of the present invention is directed to providing an interoperable DRM processing module for increasing reusability and portability of a DRM processing module and improving the interoperable DRM acceptability of a contents consuming terminal.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an interoperable Digital Rights Management (DRM) terminal including: a resource processor for performing predetermined operations for reproducing contents; and a DRM processor for managing digital rights for the contents, wherein the resource processor and the DRM processor exchange messages for interoperable managing the digital rights.

In accordance with another aspect of the present invention, there is provided an interoperable Digital Rights Management method in a terminal including a resource processor for performing predetermined operations for reproducing contents and a DRM processor for managing digital rights for the contents, the interoperable DRM method including: exchanging messages between the resource processor and the DRM processor for interoperable managing the digital rights.

In accordance with another aspect of the present invention, there is provided an interoperable Digital Rights Management device including: an interface for communicating with a terminal that performs predetermined operations for reproducing contents; and a DRM processor for managing digital rights of the contents, wherein the DRM processor exchanges messages with the terminal for interoperably managing the digital rights.

In accordance with another aspect of the present invention, there is provided an interoperable Digital Rights Management method in a device including an interface for communicating with a terminal that performs predetermined operations for reproducing contents and a DRM processor for managing digital rights of the contents, the interoperable DRM method including: exchanging messages between the DRM processor and the terminal for interoperably managing the digital rights.

Advantageous Effects

According to the present invention, digital contents that Digital Rights Management of different services and different manufacturers are applied thereto can be accommodated and managed together.

According to the present invention, a DRM processing module is provided for improving reusability and portability thereof and improving interoperable DRM acceptability of a typical contents consuming terminal therethrough.

BEST MODE FOR THE INVENTION

Figure 1:
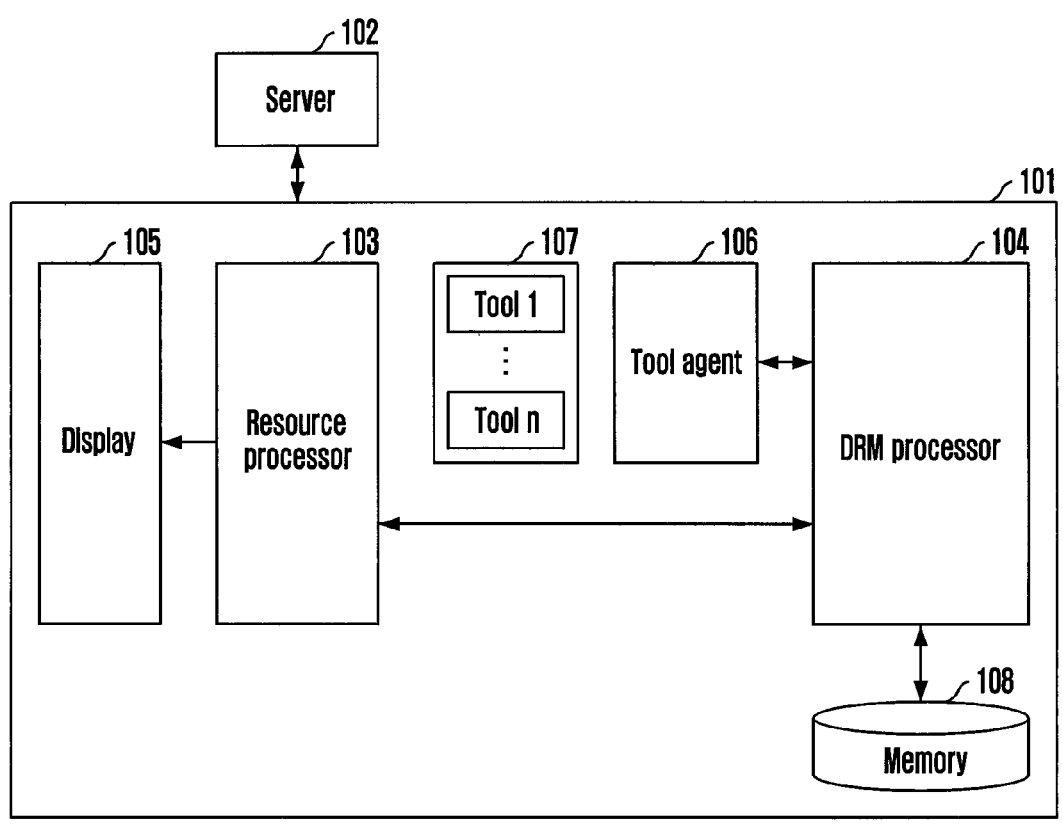
FIG. 1 illustrates an interoperable digital rights management (DRM) terminal in accordance with an embodiment of the present invention.

Hereinafter, fundamentals of the invention will be exemplarily described. Those skilled in the art may embody the fundamentals of the invention and invent various apparatuses having the concepts and scope of the present invention although the fundamentals of the present invention are not clearly described or illustrated in the specification. Conditional terms and embodiments in the specification are only intended to describe concepts of the invention, and it should not be understood that the invention is limited by the conditional terms and embodiments.

Also, it should be understood that all of descriptions of fundamentals, aspects, embodiments of the present invention, and a certain embodiment are intended to include structural and functional equivalents thereof. Furthermore, it should be understood that such equivalents include not only well-known equivalents but also all equivalents that will be invented to perform the same function regardless of a structure thereof.

Therefore, it should be understood that a block diagram of the specification shows conceptual aspects of an exemplary circuit for embodying fundamentals of the present invention. Similarly, all flowcharts, state transition diagrams, pseudo codes may substantially represent computer-readable medium, and various processes performed by a computer or a processor although the computer or the processor is not clearly illustrated.

Functions of various devices shown in a drawing including functional blocks shown as processors or similar concepts may be provided not only using dedicated hardware but also using hardware capable of performing predetermined software. When the functions are provided by a processor, the functions may be provided by a single dedicated processor, a single shared processor, or a plurality of individual processors, some of which may be shared.

Terms used for a processor, control, or similar concepts may not be understood to exclusively citing hardware capable of performing software, and they may be understood to suggestively include a digital signal processor (DSP) hardware, a read only memory (ROM), a random access memory (RAM), and non-volatile memory for storing software without limitation.

In claims, constituent elements expressed as means for performing functions described in the specification are intended to include combination of circuit devices for performing the functions and all methods performing the functions including all types of software having firmware/micro codes. Also, the constituent elements are connected to a proper circuit for performing the software to perform the functions. Any means providing the functions should be understood as an equivalent to that understood from the specification because the present invention defined by the claims is a combination of functions provided by the diverse means and methods described in the claims.

The advantages, features and aspects of the invention will become apparent from the following description of the embodiments with reference to the accompanying drawings, which is set forth hereinafter. Therefore, those skilled in the art may easily embody technical aspects of the invention. For simplicity and clarity of illustration, the drawing figures illustrating the general manner of construction, and descriptions, and details of well-known features and techniques may be omitted to avoid unnecessarily obscuring the invention. Hereinafter, preferred embodiments of the present invention will be described in detail with reference to the accompanying drawings.

Within a range of clearly describing functions and operations of each constituent elements of interoperable DRM terminal and method according to the present invention, Digital Media Project (DMP) standard including an interoperable DRM platform and related DMP standard documents may be included in the specification as a part.

1$^{st}$ Embodiment

Interoperable Digital Rights Management (DRM) Terminal

FIG. 1 is a block diagram illustrating an interoperable Digital Rights Management (DRM) terminal in accordance with an embodiment of the present invention.

The interoperable DRM terminal 101 includes a resource processor 103 for reproducing contents, and a DRM processor 104 for managing Digital Rights for contents. The resource processor 103 and the DRM processor 104 exchange messages for interoperably managing digital rights.

Here, the terminal is a device for reproducing contents. The terminal may include all types of reproducing devices such as a personal computer (PC), a Personal Digital Assistant (PDA), a Portable Multimedia Player (PMP), and a MP3 player.

The interoperable DRM terminal 101 may be connected to a server 102 through a wired or wireless network. The server 102 may include a contents server for providing contents, a tool server for providing a tool for encoding or decoding contents, and a license server for providing licenses of using contents. Also, the server 102 may include a contents producing device interworking with the contents sever, the tool server, or the license server.

The resource processor 103 performs related operations for reproducing contents. The resource processor 103 may be a Central Processing Unit (CPU) for reproducing contents. The contents reproduced by the resource processor 103 is transmitted to and displayed on a display 105. The resource processor 103 exchanges messages with the DRM processor 104 for interoperable management.

The DRM processor 104 exchanges messages with the resource processor 103 for interoperably managing digital rights of contents to be reproduced at the resource processor 103.

The resource processor 103 and the DRM processor 104 are not limited to be embodied as physically independent processors for exchanging messages for interoperably managing digital rights. The resource processor 103 and the DRM processor 104 may be embodied as software for processing resources and another software for processing DRM in one processor in order to individually perform operations for exchanging messages.

The messages that are exchanged between the resource processor 103 and the DRM processor 104 for interoperability may employ a standard protocol for improving reusability and portability of a DRM processing module for digital contents with heterogeneous DRM.

The conventional DRM technology was incapable of accommodating and managing digital contents with DRMs of different services and different manufacturers applied thereto together because it cannot unify heterogeneous DRMs provided from various manufacturers. In order to accommodate and manage heterogeneous DRMs in one platform in the conventional DRM technology, DRM information applied to contents should be analyzed, and tool agent modules used for each of DRMs should be loaded for performing copyright protection according to content protection information.

According to the conventional DRM technology, a manufacturer of a terminal had burden to embody a DRM processing module for each terminal in a contents consuming terminal.

According to the present embodiment, an interoperable DRM processor can be operated on contents consuming terminals of different services or different manufacturers by enabling the resource processor 103 and the DRM processor 104 to exchange messages according to a standard protocol for digital contents that heterogeneous DRM is (i.e. different types of DRM are) applied thereto.

The interoperable DRM terminal 101 according to the present embodiment further includes a tool agent 106, tools 1 to n 107, and a memory 108.

The tool agent 106 manages the tools 107 for DRM of contents by cooperating with the DRM processor 104. According to a request of the DRM processor 104, the tool agent 106 manages the tools 107 suitable for DRM for reproducing corresponding contents.

The memory 108 stores information directly related to contents protected asset such as a tool binary file and rights in a protected form. Data can be protected by the memory 108 from accessing and modifying with malicious purpose.

Hereinafter, messages exchanged between the resource processor 103 and the DRM processor 104 for interoperable DRM will be described in detail.

<Initial DRM Processor Message and Terminate DRM Processor Message>

Figure 2:
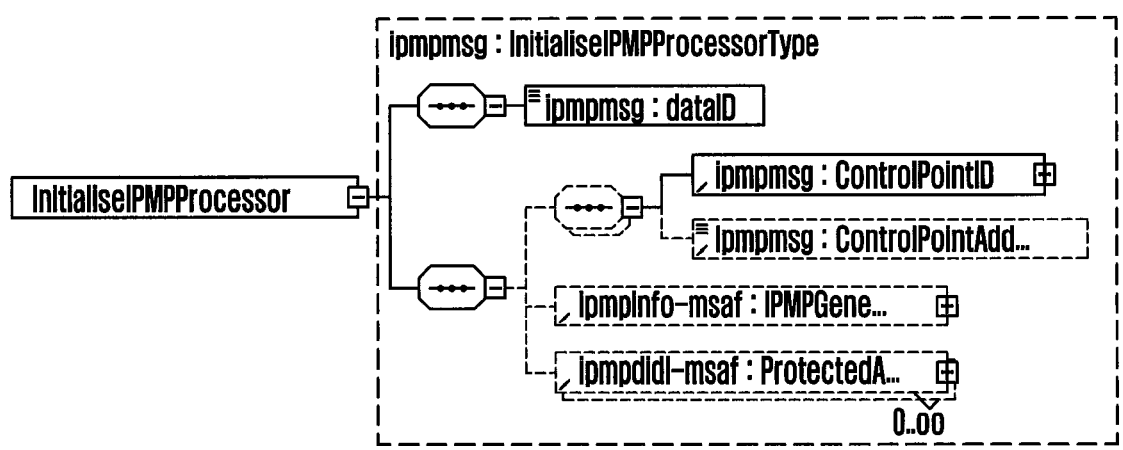
FIG. 2 shows an Initialise DRM Processor Message in accordance with an embodiment of the present invention.
Figure 3:
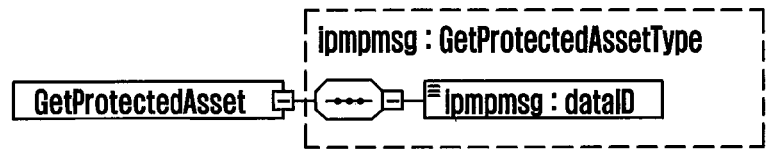
FIG. 3 shows a Terminate DRM Processor Message in accordance with an embodiment of the present invention.

FIG. 2 shows an Initialise DRM Processor Message in accordance with an embodiment of the present invention, and FIG. 3 shows a Terminate DRM Processor Message in accordance with an embodiment of the present invention.

At first, the Initialise DRM Processor Message will be described.

The resource processor 103 transmits an Initialise DRM Processor Message to the DRM processor 104 for initialising and driving the DRM processor 104. The Initialise DRM Processor Message may include identification information (ControlPointID) of a control point that the resource processor 103 supports. The control point includes information on a location where content protection can be performed. For example, the control point includes location information where contents can be protected by encoding and decoding contents on a media stream. For example, a buffer between Codec can be used. The DRM processor 104 can be operated only on control points that the resource processor 103 supports. If the resource processor 103 cannot provide control points that the DRM processor 104 or the tool agent 106 need, related operations may be terminated by generating an exception.

The Initialise DRM Processor message may further include control point information (ControlPointID, ControlPointAddress), general info descriptor information having tool list information for initialising the DRM processor 104, and protected asset information of contents (ProtectedAsset).

Control point address information may be included as well as the control point identification information when a physical address is required for interaction of control points.

The general info descriptor information may include information on a list of tools that are needed to download and to load as default for driving the DRM processor 104.

The protected asset information (ProtectedAsset) may include tool information for contents, rights information for contents, and contents related information. The tool information may include information on tools for encoding and decoding corresponding contents, information on configuration of tools, and identification information of control points. The rights information may include license information of contents to be reproduced, and the contents related information includes general serge information for corresponding contents.

The Initialise DRM Processor Message may further include identification information (dataID) for identifying messages.

An embodiment of the Initialise DRM Processor Message is shown below.

```
<element name="InitialiseIPMPProcessor"
    type="ipmpmsg:InitialiseIPMPProcessorType"
    substitutionGroup="ipmpmsg:Data_BaseClass"/>
<complexType name="InitialiseIPMPProcessorType">
    <complexContent>
        <extension base="ipmpmsg:Data_BaseClassType">
            <sequence>
                <sequence minOccurs="0" maxOccurs="unbounded">
                    <element ref="ipmpmsg:ControlPointID"/>
                    <element ref="ipmpmsg:ControlPointAddress"
                        minOccurs="0"/>
                </sequence>
                <element
                    ref="ipmpinfo-msaf:IPMPGeneralInfoDescriptor"
                    minOccurs="0"/>
                <element ref="ipmpdidl-msaf:ProtectedAsset"
                    minOccurs="0" maxOccurs="unbounded"/>
            </sequence>
        </extension>
    </complexContent>
</complexType>
```

Hereinafter, the Terminate DRM Processor Message will be described.

The Terminate DRM Processor Message is a message transmitted from the resource processor 103 to the DRM processor 104 to terminate the DRM processor 104. When the DRM processor 104 receives the Terminate DRM Processor Message, the DRM processor 104 releases resources including previously loaded tools.

The Terminate DRM Processor Message may further include identification information (dataID) for identifying messages.

An embodiment of the Terminate DRM Processor Message will be shown below.

```
<element name="TerminateIPMPProcessor"
    type="ipmpmsg:TerminateIPMPProcessorType"
    substitutionGroup="ipmpmsg:Data_BaseClass"/>
<complexType name="TerminateIPMPProcessorType">
    <complexContent>
        <extension
            base="ipmpmsg:Data_BaseClassType"/>
    </complexContent>
</complexType>
```

<Get Protected Asset Message and Get Protected Asset Response Message>

Figure 4:
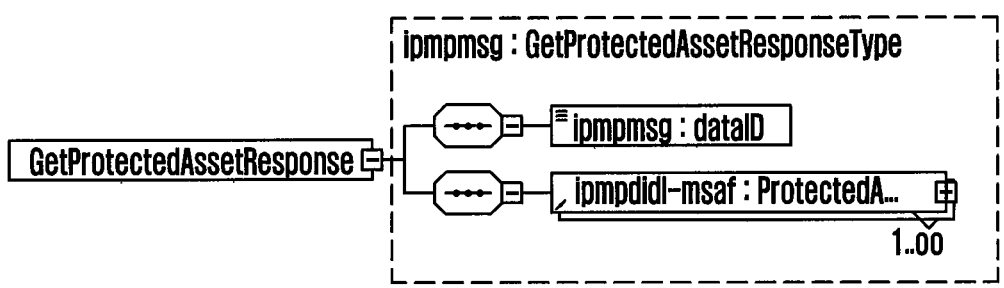
FIG. 4 shows a Get Protected Asset Message for DRM in accordance with an embodiment of the present invention.
Figure 5:
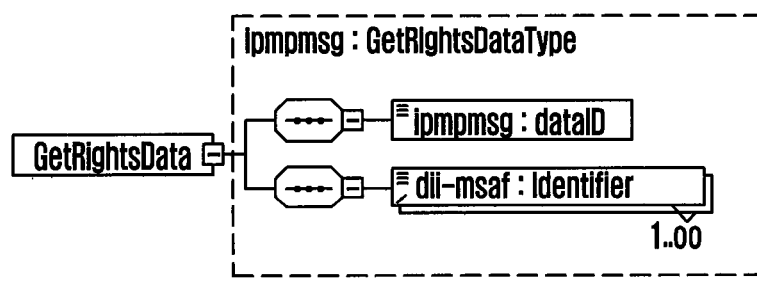
FIG. 5 shows a Get Protected Asset Response Message for DRM in accordance with an embodiment of the present invention.

FIG. 4 shows a Get Protected Asset Message for DRM in accordance with an embodiment of the present invention, and FIG. 5 is a diagram illustrating a Get Protected Asset Response Message for DRM in accordance with an embodiment of the present invention.

The Get Protected Asset Message is a message transferred from the DRM processor 104 to the resource processor 103 for requesting protected asset information of contents to reproduce.

The protected asset information, which is requested to the resource processor 13 in the Get Protected Asset Message, may include information on tools and rights for contents and related information of the contents. The tool information includes information on tools for encoding and decoding corresponding contents, configuration information of tools, or identification information of control points. The rights information may include license information of contents to reproduce corresponding contents, and the contents related information includes general serge information for corresponding contents.

The Get Protected Asset Message is transmitted to the DRM processor 104 if it is necessary to request protected asset information of contents to reproduce. That is, when the DRM processor 104 does not includes protected asset information of contents to reproduce, the Get Protected Asset Message is transmitted.

The protected asset information may be transmitted to the DRM processor 104 by the Initialise DRM Processor Message. However, it may be necessary to request protected asset information for certain situation such as when contents need to be reproduced more than once. For example, when the protected asset information is valid only for one time reproducing of contents, the protected asset information is requested. Here, the protected asset information may be requested through the Get Protected Asset Message instead of the Initialise DRM Processor Message.

The Get Protected Asset Message may further include identification information data ID for identifying message.

An embodiment of the Get Protected Asset Message is shown in blow.

```
<element name="GetProtectedAsset"
type="ipmpmsg:GetProtectedAssetType"
substitutionGroup="ipmpmsg:Data_BaseClass"/>
<complexType name="GetProtectedAssetType">
<complexContent>
<extension base="ipmpmsg:Data_BaseClassType"/>
   </complexContent>
   </complexType>
```

The Get Protected Asset Response Message is a response for the Get Protected Asset Message transferred from the DRM processor 104. The resource processor 103 transmits the Get Protected Asset Response Message to the DRM processor 104.

Protected asset information (ProtectedAsset) included in the Get Protected Asset Response Message may include information on tools and rights for contents and related information of the contents. The tool information includes information on tools for encoding and decoding corresponding contents, configuration information of tools, or identification information of control points. The rights information may include license information of contents to reproduce corresponding contents, and the contents related information includes general serge information for corresponding contents.

The Get Protected Asset Response Message may further include identification information (dataID) for identifying messages.

An example of the Get Protected Asset Response Message will be shown in below.

```
<element name="GetProtectedAssetResponse"
type="ipmpmsg:GetProtectedAssetResponseType"/>
<complexType name="GetProtectedAssetResponseType">
<complexContent>
<extension base="ipmpmsg:Data_BaseClassType">
<sequence>
<element ref="ipmpdidl-msaf:ProtectedAsset"
maxOccurs="unbounded"/>
       </sequence>
     </extension>
   </complexContent>
</complexType>
```

<Get Rights Data Message>

Figure 6:
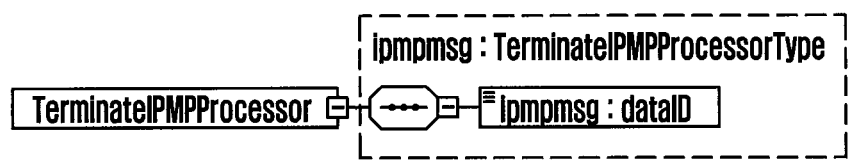
FIG. 6 shows a Get Rights Data Message for DRM in accordance with an embodiment of the present invention.

FIG. 6 shows a Get Rights Data Message for DRM in accordance with an embodiment of the present invention.

The Get Rights Data Message is a message transmitted from the DRM processor 104 to the resource processor 103 for requesting rights information of contents to reproduce. The Get Rights Data Message may include identification information of contents that requests the rights information. The right includes may include license information of contents to reproduce.

The Get Rights Data Message is transferred to the DRM processor 104 when rights information of contents to reproduce is requested to the resource processor 103. For example, when the DRM processor 104 does not have the rights information of contents to reproduce, it is requested.

The rights information may be transferred to the DRM processor 104 by the Initialise DRM Processor Message or the Get Protected Asset Response Message. However, it may be necessary to request the rights information for a certain situation, for example, when the contents need to be reproduced repeatedly. Rights information may be valid only for one time playback of corresponding contents. In this case, rights information may be requested through the Get Rights Data Message instead of the Initialise DRM Processor Message or the Get Protected Asset Response Message.

The Get Rights Data Message may further include identification information (dataID) for identifying messages.

An embodiment of the Get Rights Data Message is shown in below.

```
<element name="GetRightsData"
type="ipmpmsg:GetRightsDataType"
      substitutionGroup="ipmpmsg:Data_BaseClass"/>
<complexType name="GetRightsDataType">
<complexContent>
<extension base="ipmpmsg:Data_BaseClassType">
<sequence>
<element ref="dii-msaf:Identifier"maxOccurs="unbounded"/>
         </sequence>
       </extension>
     </complexContent>
   </complexType>
```

A Rights Data Response message is transferred from the resource processor 103 to the DRM processor 104 as a response of the resource processor for the Get Rights Data Message. The rights information included in the rights data response message may be included in the license information of reproduced contents.

\<Notify DRM Processor Event Message\>

Figure 7:
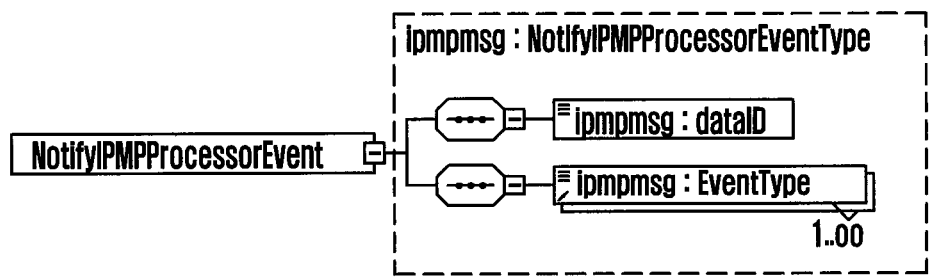
FIG. 7 shows a Notify DRM Processor Event Message for DRM in accordance with an embodiment of the present invention.

FIG. 7 is a diagram illustrating a Notify DRM Processor Event Message for DRM in accordance with an embodiment of the present invention.

The Notify DRM Processor Event Message is a message transferred from the DRM processor 104 to the resource processor 103 for reporting events generated from the DRM processor 104 to the resource processor 103. The Notify DRM Processor Event Message is a message for expressing a type of event and may include information EventType shown in Table 1.

TABLE 1

| | |
|---|---|
| 00 | CONNECTED |
| 01 | CONNECTION_FAILED |
| 02 | DISCONNECTED |
| 03 | DISCONNECTION_FAILED |
| 04 | WATERMARKDETECTED |
| 05 | PARSE_TOOLPACKDATA_SUCCESS |
| 06 | PARSE_TOOLPACKDATA_FAILED |
| 07 | UNABLE_TO_PROCESS |
| 08 | TOOL_GROUP_NOT_FOUND |
| 09 | TERMINATION_FAILED |
| 10 | CONTROLPOINT_NOT_SUPPORTED |
| 11 | UNABLE_TO_PARSE_LICENSE |
| 12 | NO_VALID_LICENSE |
| 13 | LICENSE_VALIDATION_FAILED |
| 14 | READY_TO_PLAY |
| 15 | READY_TO_BE_TERMINATED |

For example, when the DRM processor 104 receives the Terminate DRM Processor message, the DRM processor 104 releases resources including previously loaded tools and transfers an event "READY_TO_BE_TERMINATED", which is in Table 1, through the Notify DRM Processor Event Message.

The Notify DRM Processor Event Message may further include identification information (dataID) for identifying messages.

An embodiment of the Notify DRM Processor Event Message is shown in blow.

```
<element name="NotifyIPMPProcessorEvent"
type="ipmpmsg:NotifyIPMPProcessorEventType"
substitutionGroup="ipmpmsg:Data_BaseClass"/>
<complexType name="NotifyIPMPProcessorEventType">
<complexContent>
<extension base="ipmpmsg:Data_BaseClassType">
<sequence>
<element ref="ipmpmsg:EventType" maxOccurs="unbounded"/>
</sequence>
</extension>
</complexContent>
</complexType>
```

2$^{nd}$ Embodiment

Interoperable DRM Method

Figure 8:
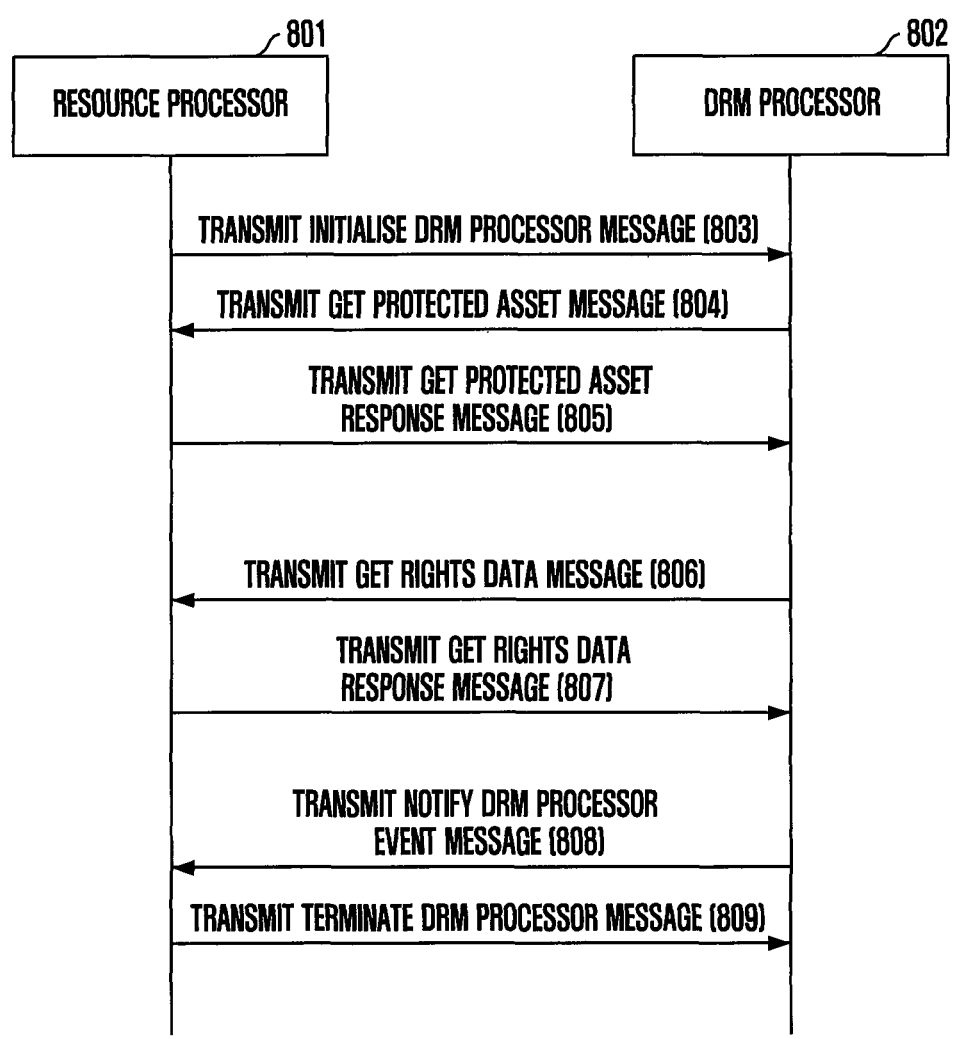
FIG. 8 is a flowchart describing an interoperable digital rights management in accordance with an embodiment of the present invention.

FIG. 8 is a flowchart illustrating an interoperable digital rights management (DRM) method in accordance with an embodiment of the present invention.

The interoperable DRM method according to the present embodiment includes a message exchange method for exchanging messages between a resource processor 801 and a DRM processor 802 to interoperably manage digital rights as an interoperable DRM method in a terminal having the resource processor for performing related operations for reproducing contents and the DRM processor 802 for managing digital rights for contents.

The resource processor 801 performs related operations for playing back the contents. The resource processor 801 exchanges messages with the DRM processor 802 for interoperably managing digital rights of the contents to playback.

The DRM processor 802 exchanges messages with the resource processor 801 for interoperably managing digital rights for contents to reproduce in the resource processor 801.

The messages exchanged between the resource processor 103 and the DRM processor 104 for guaranteeing the interoperability may include a standardized processing protocol to improve reusability and portability of a DRM processing module for digital contents that heterogeneous DRM is applied thereto.

The conventional DRM technology was incapable of accommodating and managing digital contents with DRMs of different services and different manufacturers applied thereto together because it cannot unify heterogeneous DRMs provided from various manufacturers. In order to accommodate and manage heterogeneous DRMs in one platform in the conventional DRM technology, DRM information applied to contents should be analyzed, and tool agent modules used for each of DRMs should be loaded for performing copyright protection according to content protection information. According to the conventional DRM technology, a manufacturer of a terminal had burden to embody a DRM processing module for each terminal in a contents consuming terminal.

According to the present embodiment, an interoperable DRM processor can be operated on contents consuming terminals of different services or different manufacturers by enabling the resource processor 103 and the DRM processor 104 to exchange messages according to a standard protocol for digital contents that heterogeneous DRM is applied thereto.

The message exchange method for exchanging messages between a resource processor 801 and a DRM processor 802 to interoperably manage digital rights according to the present embodiment includes transmitting an Initialise DRM Processor Message 803 from the resource processor 801 to the DRM processor 802 to initialise the DRM processor 802, and transmitting a Terminate DRM Processor Message 809 from the resource processor 801 to the DRM processor 802 for releasing resources allocated to the DRM processor 802.

The message exchange method for exchanging messages between a resource processor 801 and a DRM processor 802 to interoperably manage digital rights according to the present embodiment may further include transmitting a Get Protected Asset message 804 from the DRM processor 802 to the resource processor 801 for requesting protected asset information of contents. Here, the resource processor 801 transfers a Get Protected Asset Response Message 805 to the DRM processor 802 as a response for the Get Protected Asset Message 804.

The message exchange method for exchanging messages between a resource processor 801 and a DRM processor 802 to interoperably manage digital rights according to the present embodiment further includes transmitting a Get Rights Data Message 806 from the DRM processor 802 to the resource processor 801 for requesting rights information of contents.

Here, the resource processor 801 transfers a Get Rights Data response message 807 from the resource processor 801 to the DRM processor 802 as a response for the Get Rights Data Message 806.

The message exchange method for exchanging messages between a resource processor 801 and a DRM processor 802 to interoperably manage digital rights according to the present embodiment may further include transmitting a Notify DRM Processor Event Message 808 from the DRM processor 802 to the resource processor 801 in order to inform event state to the DRM processor 802.

Since the Initialise DRM Processor Message 803, the Terminate DRM Processor message 809, the Get Protected Asset Message 804, the Get Protected Asset Response Message 805, the Get Rights Data Message 806, the Get Rights Data Response Message 807, and the Notify DRM Processor Event Message 808, which are messages exchanged between the resource processor 801 and the DRM processor 802 for interoperably managing digital rights for contents, are identical those described in the first embodiment, the detail descriptions thereof are omitted.

3$^{rd}$ Embodiment

Device for Interoperably Managing Digital Rights

In the first embodiment, it was described that the resource processor 103 and the DRM processor 104 are included in the interoperable DRM terminal 101.

The interoperable DRM device according to the third embodiment includes an interface for communicating with a terminal that reproduces contents and a DRM processor for managing digital rights of contents. The DRM processor exchanges message with the terminal for interoperably managing digital rights. The terminal includes a resource processor for performing related operations for reproducing the contents.

Here, the terminal denotes a device for reproducing contents and may include all of reproducing devices such as a personal computer, a Set-Top box, a mobile phone, a personal digital assistant (PDA), a portable multimedia player (PMP), and a MP3 player.

A communication channel for exchanging messages between the interoperable DRM device and the terminal is not limited. For example, the interoperable DRM device according to the present embodiment may be connected through a USB port of the terminal or a wireless link such as Bluetooth.

The interoperable DRM device according to the present embodiment may further include a memory. The memory stores a tool binary file, and information directly related to contents protected assets such as rights in a protected format. The memory according to the present embodiment may protect the data from being illegally accessed or modified for malicious purpose.

Since messages exchanged between the terminal and the interoperable DRM device are identical to those described in the first embodiment, detail descriptions thereof are omitted.

4$^{th}$ Embodiment

Interoperable DRM Method

In the second embodiment, the interoperable DRM method for a terminal including the resource processor 801 and the DRM processor 802 was described.

The interoperable DRM method according to the fourth embodiment includes exchanging messages with a terminal to interoperably manage digital rights as an interoperable DRM method in a device including an interface for communicating with the terminal that reproduces contents and a DRM processor for managing digital rights for contents. The terminal includes the resource processor for performing operations for reproducing contents.

A communication channel for exchanging messages between the interoperable DRM device and the terminal is not limited. For example, a USB port of the terminal or a wireless link such as Bluetooth may be used. The communication channel for exchanging messages between the interoperable DRM device and the terminal may use independent socket communication or a web service transmit protocol, which is independent from execution environment of a terminal.

Since messages exchanged between the terminal and the interoperable DRM device are identical to those described in the first embodiment, detail descriptions thereof are omitted.

The above described method according to the present invention can be embodied as a program and stored on a computer-readable recording medium. The computer-readable recording medium is any data storage device that can store data which can be thereafter read by the computer system. The computer-readable recording medium includes a read-only memory (ROM), a random-access memory (RAM), a CD-ROM, a floppy disk, a hard disk and an optical magnetic disk.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The present invention is applied to a Digital Rights Management (DRM) technology for digital contents.

What is claimed is:

1. An interoperable Digital Rights Management (DRM) terminal, comprising:
   a resource processor for reproducing contents, each of the contents being protected by one of a plurality of types of DRM; and
   a DRM processor for managing the plurality of types of DRM for the contents, wherein
   the resource processor and the DRM processor are disposed in the same terminal, and exchange messages to process each of the contents according to its corresponding one of the plurality of types of DRM.

2. The interoperable DRM terminal of claim 1, wherein the resource processor sends an Initialise DRM Processor Message for initialising the DRM processor and a Terminate DRM Processor Message for releasing resources allocated to the DRM processor.

3. The interoperable DRM terminal of claim 2, wherein the Initialise DRM Processor Message includes identification information of a control point that the resource processor supports.

4. The interoperable DRM terminal of claim 3, wherein the Initialise DRM Processor Message includes address information of the control point, general info descriptor information including a tool list for initialising the DRM processor, and protected asset information of the contents.

5. The interoperable DRM terminal of claim 4, wherein the protected asset information includes tool information and rights information for the contents and contents related information.

6. The interoperable DRM terminal of claim 2, wherein the DRM processor sends a Get Protected Asset Message to the resource processor for requesting protected asset information of the contents.

7. The interoperable DRM terminal of claim 6, wherein the protected asset information includes tool information and rights information for the contents, and contents related information.

8. The interoperable DRM terminal of claim 2, wherein the DRM processor sends a Get Rights Data Message to the resource processor for requesting rights information of the contents.

9. The interoperable DRM terminal of claim 8, wherein the Get Rights Data Message includes identification information of the contents.

10. The interoperable DRM terminal of claim 2, wherein the resource processor sends a Notify DRM Processor Event Message to the DRM processor for informing the DRM processor of an event state.

11. An interoperable Digital Rights Management (DRM) method in a terminal including a resource processor for reproducing contents, each of the contents being protected by one of a plurality of types of DRM, and a DRM processor for managing the plurality of types of DRM for the contents, the interoperable DRM method comprising:
exchanging messages between the resource processor and the DRM processor so as to process each of the contents according to its corresponding one of the plurality of types of DRM.

12. The interoperable DRM method of claim 11, wherein said exchanging message includes:
sending an Initialise DRM Processor Message from the resource processor to the DRM processor for initialising the DRM processor; and
sending a Terminate DRM Processor Message from the resource processor to the DRM processor for releasing resources allocated to the DRM processor.

13. The interoperable DRM method of claim 12, wherein the Initialise DRM Processor Message includes identification information of a control point that the resource processor supports.

14. The interoperable DRM method of claim 13, wherein the Initialise DRM Processor Message includes address information of the control point, general info descriptor information including a tool list for initialising the DRM processor, and protected asset information of the contents.

15. The interoperable DRM method of claim 14, wherein the protected asset information includes tool information and rights information for the contents and contents related information.

16. The interoperable DRM method of claim 12, wherein said exchanging message includes sending a Get Protected Asset Message from the DRM processor to the resource processor for requesting protected asset information of the contents.

17. The interoperable DRM method of claim 16, wherein the protected asset information includes tool information and rights information for the contents, and contents related information.

18. The interoperable DRM method of claim 12, wherein said exchanging messages includes sending a Get Rights Data Message from the DRM processor to the resource processor for requesting rights information of the contents.

19. The interoperable DRM method of claim 18, wherein the Get Rights Data Message includes identification information of the contents.

20. The interoperable DRM method of claim 12, wherein said exchanging messages includes sending a Notify DRM Processor Event Message to the DRM processor for informing the DRM processor of an event state.

21. An interoperable Digital Rights Management (DRM) device comprising:
an interface for communicating with a terminal that is configured to reproduce contents, each of the contents being protected by one of a plurality of types of DRM; and
a DRM processor for managing the plurality of types of DRM for the contents, wherein
the DRM processor exchanges messages with the terminal to process each of the contents according to its corresponding one of the plurality of types of DRM.

22. The interoperable DRM device of claim 21, wherein the interoperable DRM device receives an Initialise DRM Processor Message for initialising the DRM processor and a Terminate DRM Processor Message for releasing resources allocated to the DRM processor from the terminal.

23. The interoperable DRM device of claim 22, wherein the Initialise DRM Processor Message includes identification information of a control point that the resource processor supports.

24. The interoperable DRM device of claim 23, wherein the Initialise DRM Processor Message includes address information of the control point, general info descriptor information including a tool list for initialising the DRM processor, and protected asset information of the contents.

25. The interoperable DRM device of claim 24, wherein the protected asset information includes tool information and rights information for the contents and contents related information.

26. The interoperable DRM device of claim 22, wherein a Get Protected Asset Message is sent to the terminal for requesting protected asset information of the contents.

27. The interoperable DRM device of claim 26, wherein the protected asset information includes tool information and rights information for the contents, and contents related information.

28. The interoperable DRM device of claim 22, wherein a Get Rights Data Message is sent to the terminal for requesting rights information of the contents.

29. The interoperable DRM device of claim 28, wherein the Get Rights Data Message includes identification information of the contents.

30. The interoperable DRM device of claim 22, wherein a Notify DRM Processor Event Message is sent to the terminal for informing the terminal of an event state in the DRM processor.

31. An interoperable Digital Rights Management (DRM) method for a device including an interface for communicating with a terminal that is configured to reproduce contents, each of the contents being protected by one of a plurality of types of DRM, and a DRM processor for managing the plurality of types of DRM for the contents, the interoperable DRM method comprising:
exchanging messages between the DRM processor and the terminal so as to process each of the contents according to its corresponding one of the plurality of types of DRM.

32. The interoperable DRM method of claim 31, wherein said exchanging messages includes:
receiving an Initialise DRM Processor Message for initialising the DRM processor from the terminal; and
receiving a Terminate DRM Processor Message for releasing resources allocated to the DRM processor from the terminal.

33. The interoperable DRM method of claim 32, wherein the Initialise DRM Processor Message includes identification information of a control point that the resource processor supports.

34. The interoperable DRM method of claim 33, wherein the Initialise DRM Processor Message includes address information of the control point, general info descriptor information including a tool list for initialising the DRM processor, and protected asset information of the contents.

35. The interoperable DRM method of claim 34, wherein the protected asset information includes tool information and rights information for the contents and contents related information.

36. The interoperable DRM method of claim 32, wherein said exchanging message further includes sending a Get Protected Asset Message to the terminal for requesting protected asset information of the contents.

37. The interoperable DRM method of claim 36, wherein the protected asset information includes tool information and rights information for the contents, and contents related information.

38. The interoperable DRM method of claim 32, wherein said exchanging messages further includes sending a Get Rights Data Message to the terminal for requesting rights information of the contents.

39. The interoperable DRM method of claim 38, wherein the Get Rights Data Message includes identification information of the contents.

40. The interoperable DRM method of claim 32, wherein said exchanging message includes sending a Notify DRM Processor Event Message to the terminal for informing the terminal of an event state in the DRM processor.

\* \* \* \* \*